Jan. 15, 1963 F. A. DURAND 3,073,399
AUTOMATIC FILLER FOR FRUIT AND THE LIKE
Filed June 4, 1957 9 Sheets-Sheet 1

INVENTOR
Fred A. Durand,
By
R. Wilson Corder
ATTORNEY

Jan. 15, 1963 F. A. DURAND 3,073,399
AUTOMATIC FILLER FOR FRUIT AND THE LIKE
Filed June 4, 1957 9 Sheets-Sheet 6

INVENTOR
*Fred A. Durand,*
BY *R. Wilson Corder*
ATTORNEY

Jan. 15, 1963 F. A. DURAND 3,073,399
AUTOMATIC FILLER FOR FRUIT AND THE LIKE
Filed June 4, 1957 9 Sheets-Sheet 8

INVENTOR
Fred A. Durand,
BY R. Wilson Corder
ATTORNEY

United States Patent Office 3,073,399
Patented Jan. 15, 1963

3,073,399
AUTOMATIC FILLER FOR FRUIT AND THE LIKE
Fred A. Durand, Woodbury, Ga., assignor to Durand Machinery, Inc., Woodbury, Ga., a corporation of Georgia
Filed June 4, 1957, Ser. No. 663,522
9 Claims. (Cl. 177—53)

This invention relates to filling or packaging devices, and more particularly to a fully automatic machine for filling tubs or baskets of fruit such as peaches, within a very small weight tolerance.

Heretofore various means have been employed to fill baskets for the commercial market, ranging from a cumbersome operation in which the tubs are filled by hand, weighed, fruit added and subtracted therefrom, and a final result of dubious accuracy reached in which the tub may be over-weight or under-weight.

Briefly, the present invention contemplates a primary conveyor system and a secondary conveyor system, the primary conveyor system serves to pass articles received thereon in a circulatory path while the secondary conveyor system successively positions receptacles adjacent the primary conveyor system in first and second weighing zones. The primary conveyor system includes a first discharge conveyor which is selectively operable to cooperate with other conveyors of the primary conveyor system in passing the articles in the circulatory path or to discharge the articles to a first weighing zone or station. The first discharge conveyor has a relatively high capacity whereby a receptacle within the first weighing zone is filled rapidly to slightly less than capacity and then passed to a second weighing zone or station. At the second weighing zone, a second discharge conveyor of the primary conveyor system having a relatively low capacity feeds successive articles one at a time into the receptacle whereby very accurate weighing of the articles within the receptacle is achieved.

The device of the present invention includes electrical circuitry and motors by which the conveyor systems are operated and by which the first discharge conveyor is alternated from one operation to the other in response to actuation of the circuitry by the first weighing station. Likewise, the second discharge conveyor is actuated by circuitry controlled by the second weighing station, the arrangement being such that the secondary conveyor system is indexed to move the successive receptacles along their prescribed path for successive positioning in the first and second weighing stations in response to signals from both the first and second weighing stations.

Associated with the secondary conveyor system is a vibrator by means of which the articles received within the receptacles are packed before being discharged.

It will be understood that while the present invention is particularly suited to the weighing of fruits, such as peaches, the inventive concept herein disclosed is applicable to the filling of various receptacles and a wide variety of articles.

An object of this invention is to provide an automatic fruit filling device which will be accurate within the weight of one piece of the article being packaged;

Another object is to provide simplicity in such a device;

Another object is to provide economy of operation in a peach packing or filling machine;

Another object is to provide continuous and uninterrupted operation of such an instrumentality;

A still further object is to provide a scale-hold circuit insuring accuracy of weighing in a filler for fruit and the like;

Another object is to make possible a reversible cross belt in such a machine;

Another object is to provide a major and a minor filling belt in a device of the instant type, in conjunction with synchronized gates operating in conjunction therewith;

Another object is to provide a fully coordinated automatic device for filling baskets of fruit, vegetables, and similar objects;

Another object is to provide economy of manufacture of such a machine.

These and other objects made apparent during the further progress of this specification are made possible through the instant invention, a full and complete understanding of which is facilitated by reference to the drawings herein, in which:

Figure 1:
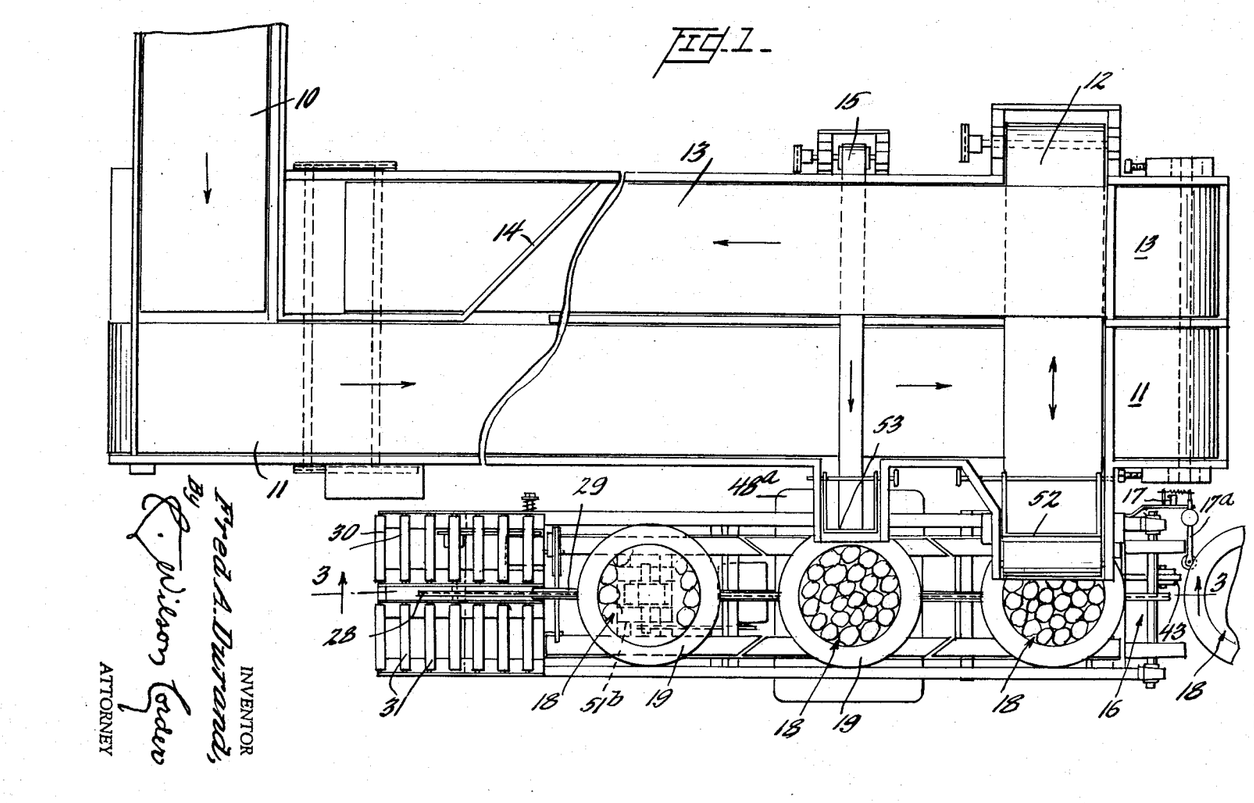
FIG. 1 is a top plan view of the instant machine, showing particularly the system of belts characterizing same.
Figure 2:
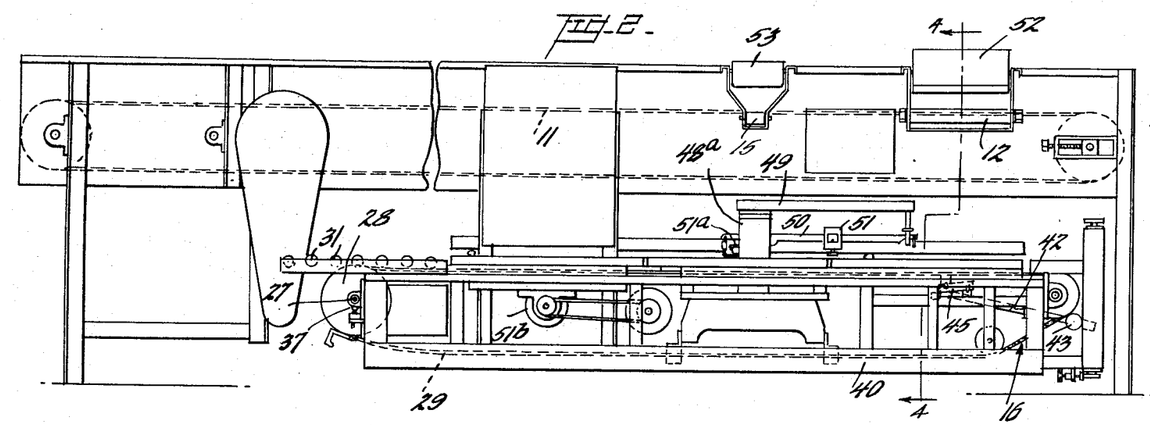
FIG. 2 is a side view of the structure of FIG. 1.
Figure 3:
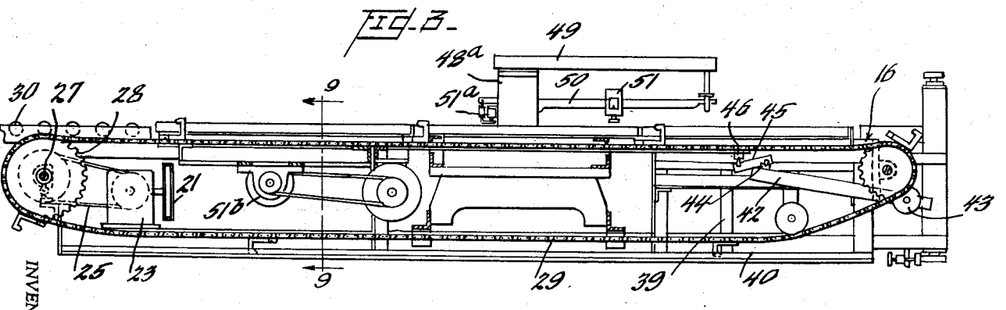
FIG. 3 is a vertical sectional view taken along the line of 3—3 of FIG. 1, looking in the direction of the arrows.

Referring now to the drawings, FIG. 1, the numeral 10 designates a wide belt of conventional construction and driven in the usual manner for the purpose of delivering peaches from the sizer to a front belt 11 moving in a clock-wise direction, which is in turn crossed by a primary delivery belt 12 which normally moves to the rear or left, but which is reversible in a manner made clear during the further progress of this specification.

Belt 12 passes under a back belt 13 which runs in the opposite direction from belt 11 and which has a baffle or directional element 14 positioned near one end thereof. A second delivery belt 15 which when actuated moves only forwardly or to the front of the machine, passes under 13 and over 11.

A pan chain upon which the pans containing the facing fruit are initially placed is positioned to the right-front of the device, terminates at the conveyor 16 of the filling machine, a switch 17 having an operating arm 17a at this point stopping said chain (which is not shown)

when actuated by a pan 18. The filling machine conveyor cannot advance until this switch is depressed.

Figure 4:
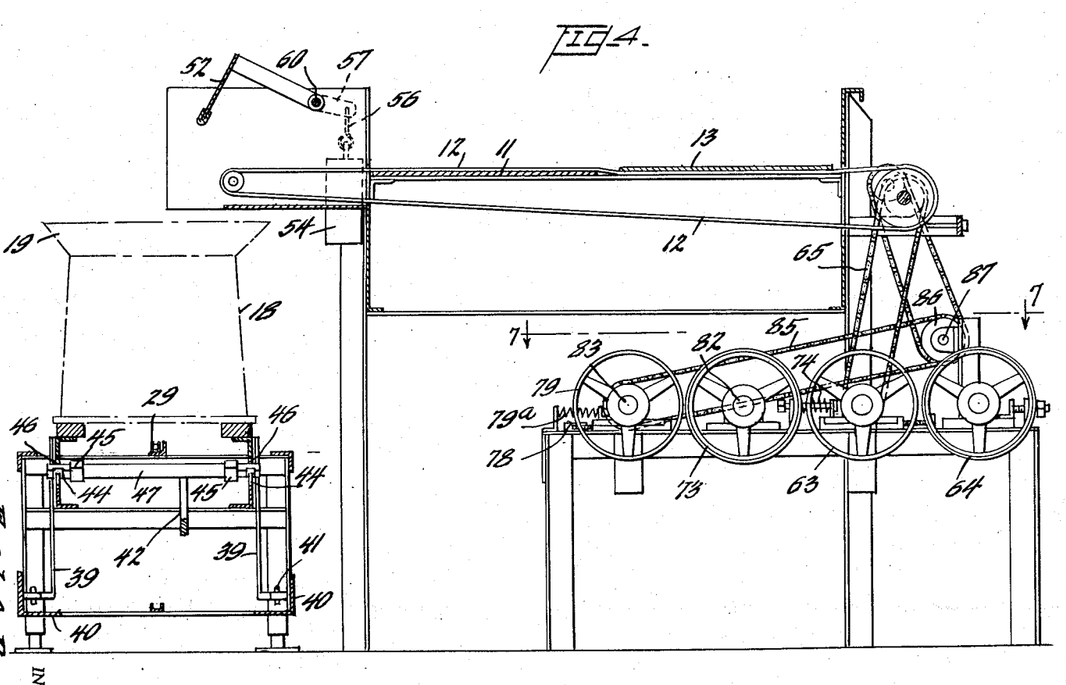
FIG. 4 is a vertical sectional view taken along the line 4—4 of FIG. 2, looking in the direction of the arrows.

In practising the instant invention, as in the packing of peaches for example, regular facer pans, tubs and liners are used, with the addition of a special rim 19 (FIG. 4) applied to the small end of the tub for the purpose of preventing fruit or the like from spilling and to hold the liner in place. The pans are covered with facing peaches by hand in the usual manner, and the only labor required is to place the tub and liner on the pan and to remove the tub after filling and shaking.

Figure 5:
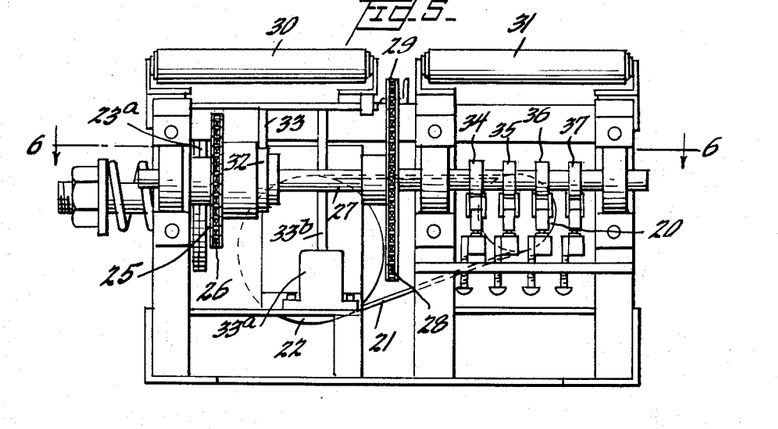
FIG. 5 is an end view of the conveyor mechanism shown in FIG. 1, illustrating part of the controls therefor.
Figure 6:
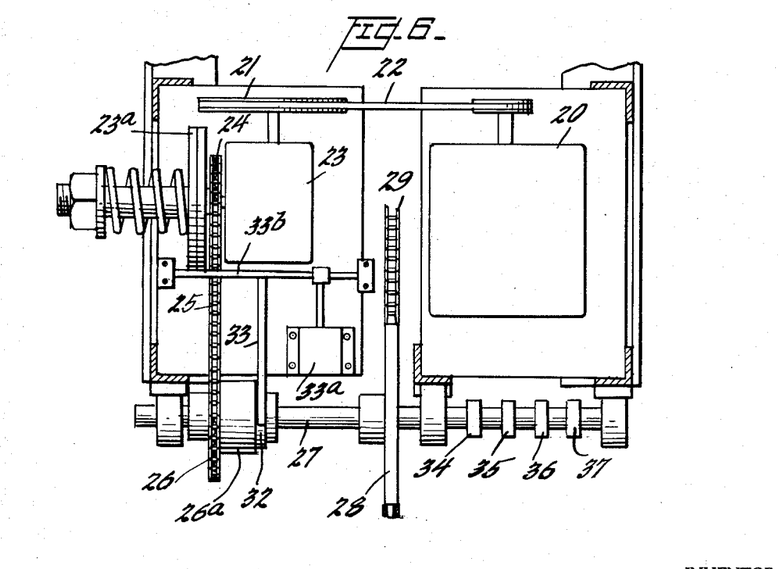
FIG. 6 is a horizontal sectional view taken along the line 6—6 of FIG. 5.
Figure 15:
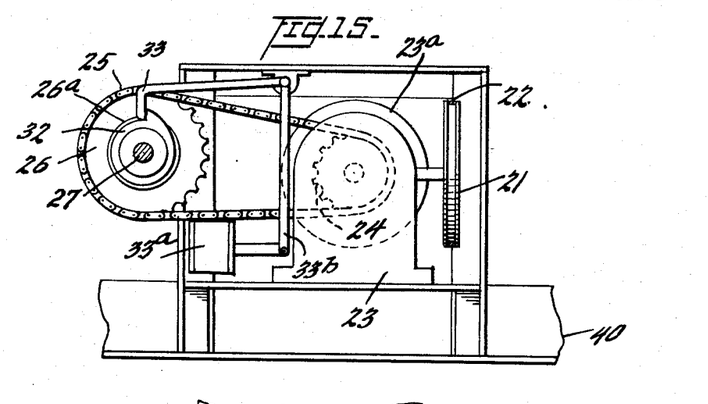
FIG. 15 is an enlarged fragmentary view taken from the side and showing in part the main conveyor drive mechanism.

Conveyor 16 is driven in the following manner (see FIGS. 3, 5, 6 and 15): A motor, preferably electric, 20, drives a pulley 21 through a belt 22, connecting with a gear box 23 which is associated with a conventional s'ip clutch 23a and a sprocket 24 which in conjunction with chain 25 drives a second sprocket 26 operating on a conventional one revolution clutch 26a mounted on shaft 27 to drive main conveyor sprocket 28 upon which operates chain 29. Rollers 30 and 31 are idlers upon which the pans roll as they leave the machine. A release mechanism 32 (FIG. 15) is mounted on shaft 27 adjacent sprocket 26 and in conjunction with operating lever or latch 33 and permits the forward movement of the conveyor a predetermined distance on each phase of the operation of the machine. Slip clutch 23a is used for the purpose of starting the conveyor smoothly without jerk. The one revolution clutch 26a controls the forward movement of the conveyor. When latch 33 is in the down position the clutch is disengaged and the conveyor is stationary and when the latch is raised momentarily by the solenoid 91 acting through lever arm 33b the clutch engages causing sprocket 26 to make one revolution thereby moving the conveyor forward from one filling position to the next. Control switches 34, 35, 36 and 37 are positioned beneath the conveyor (see FIGS. 5 and 17 of the drawings).

Figure 10:
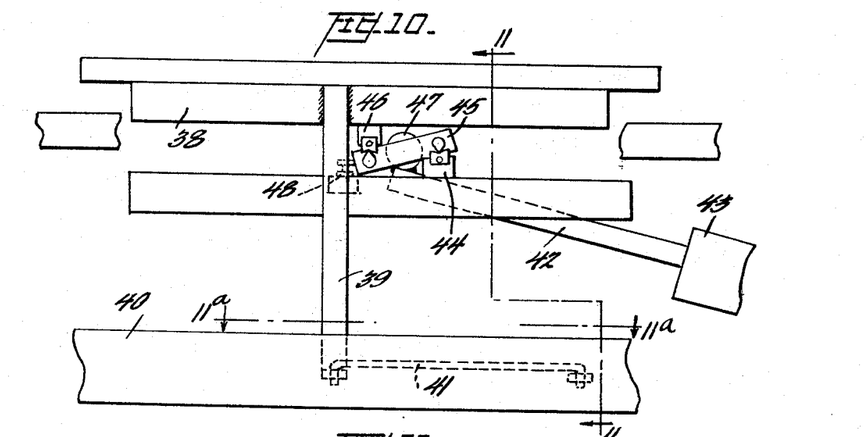
FIG. 10 is an enlarged detail view showing the initial weight platform and its associated scale mechanism.
Figure 11:
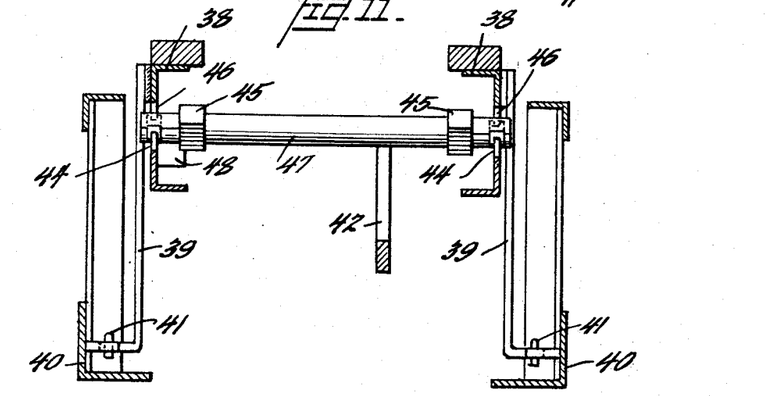
FIG. 11 is a vertical sectional view taken along the line 11—11 of FIG. 10, looking in the direction of the arrows.
Figure 11A:
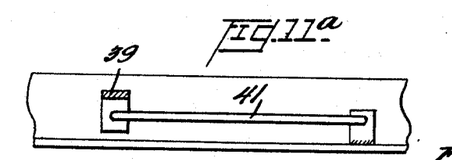
FIG. 11a is a fragmentary view taken along the line 11a—11a of FIG. 10 and showing certain reinforcing structure at that point.
Figure 12:
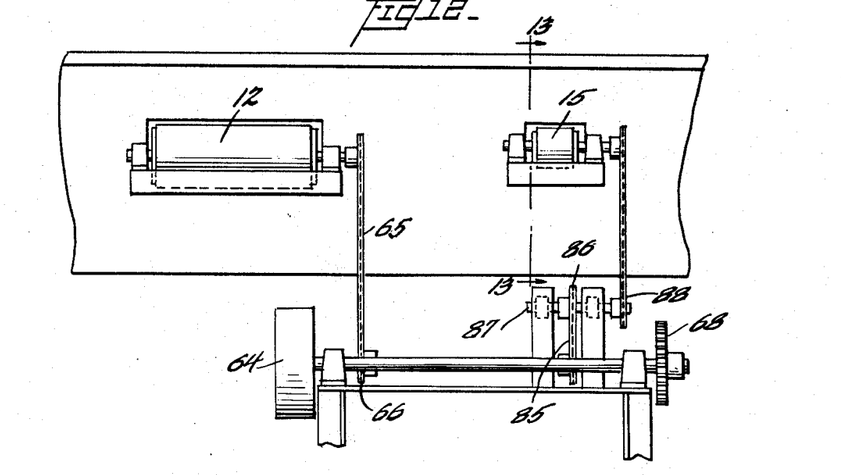
FIG. 12 is an enlarged side (or end) view showing the two cross conveyors and certain associated mechanism.
Figure 13:
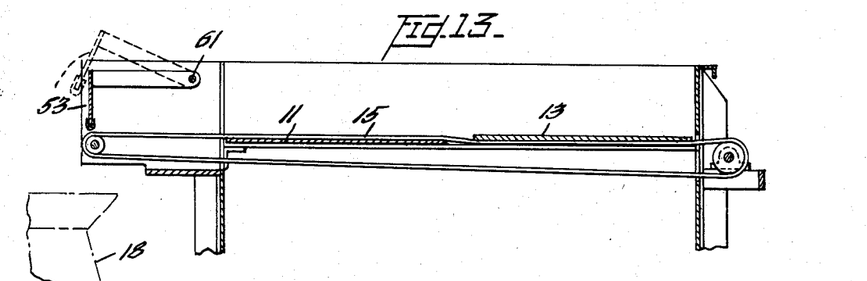
FIG. 13 is a vertical cross sectional view taken along the line 13—13 of FIG. 12.

Attention is now directed to the initial weighing station of the instant device (FIGS. 10 and 11). A pan with the facing fruit and tub arriving at this point causes vertically movable track and platform 38, stabilized by center column 39 and fixed frame 40 and cross-arm 41, to be depressed slightly which in turn causes scale arm 42 to ride downwardly against counter-weight 43 in conjunction with linkage 44, 45, 46 and supporting rod or bar 47, as to close a switch 48 when a given weight of fruit is in the container, this in turn causing the filling gate to be closed, the filling belt to reverse and the conveyor to advance one station, as will be explained hereafter. More specifically, numeral 46 denotes a pivot and bearing, the movable pivot being attached to arm 45 and movable bearing to platform 38. 44 is also a pivot and bearing, the pivot being attached to arm 45, and the stationary bearing attached to frame 40. As the scale platform 38 moves vertically, the pivot and bearing 46 move up and down as arm 45 rotates with the pivot and bearing 44 for center of rotation. Two arms 45 with pivots at each end of each are fixed to shaft 47, as is arm 42.

Figure 16:
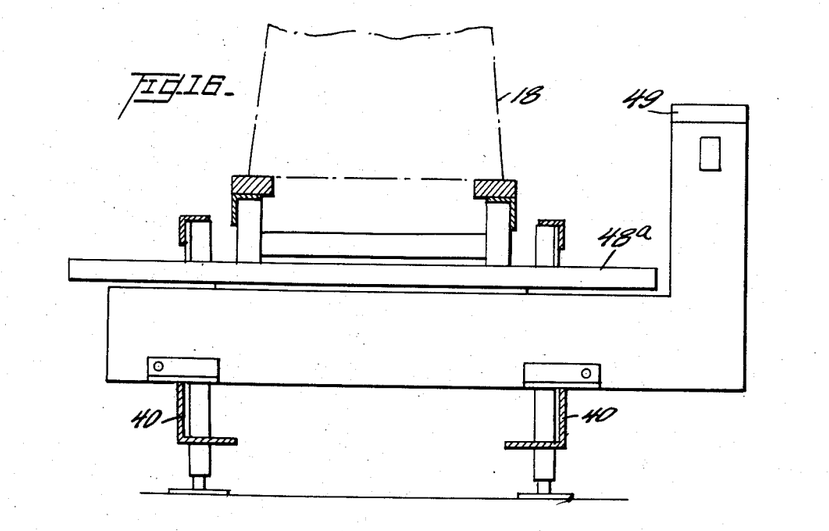
FIG. 16 is an enlarged vertical sectional view taken at right angles through the second weighing station.

The second or final weight station (FIGS. 3 and 16) is similar to the first insofar as platform operation is concerned, but has a much more delicate scale 48a of conventional construction however with the usual L support 49, weight indicating bar 50, and adjusting member 51. The belt 15 feeds the fruit one at a time, and therefore when the exact amount of fruit desired has been placed in the tub above, this in turn actuates a switch 51a and causes the small gate above to close, the filling belt to stop and the tub to advance one more step to the shaker station.

At this point the tub is shaken down by a conventional shaker 51b, which operates continuously, after which it is advanced automatically to an inverter (not shown) and then manually removed from the line.

Figure 14:
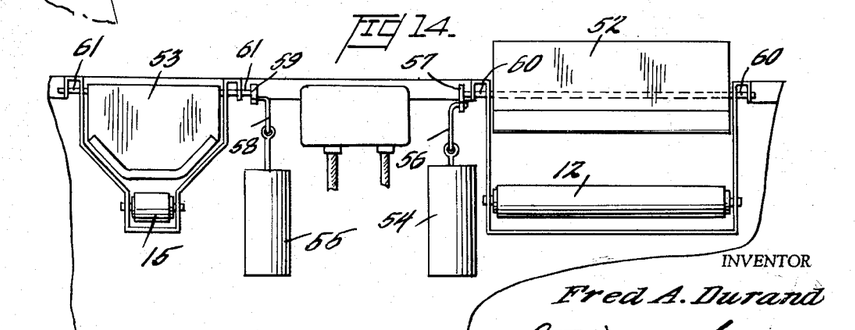
FIG. 14 is an enlarged fragmentary view showing the two discharge or unloading gates and their controls.

Control gates 52 and 53 (FIG. 14) are operated by a pair of solenoids 54 and 55, operating through linkage 56, and 57, and 58 and 59 in such a manner that when the solenoids are energized said gates are caused to swing or pivot outwardly at their anchoring points 60 and 61 and thereby permit fruit travelling on belts 12 and 15 to be discharged into the tubs below to a predetermined weight.

When the gate of the first weighing station is opened, a second solenoid 60a in conjunction with relay 60b causes belt 12 which normally moves to the rear, to be reversed, this being accomplished through linkage 61—62 moving friction wheel 63 away from wheel 64 through which it normally serves to drive belt 12 through chain 65 and sprocket 66, 64 being actuated by sprocket chain 67 driving gear 68, said chain in turn being actuated by sprocket member 69 fixedly mounted on a shaft 70 which is turned by a source of power (not shown) acting on pulley 71 through belt 72. Bringing wheel 63 into contact with wheel 73 thus reverses the direction of travel of belt 12 in a simple and effective manner. Spring 74 normally holds 63 in contact with 64 when the governing solenoid is not energized.

Figure 7:
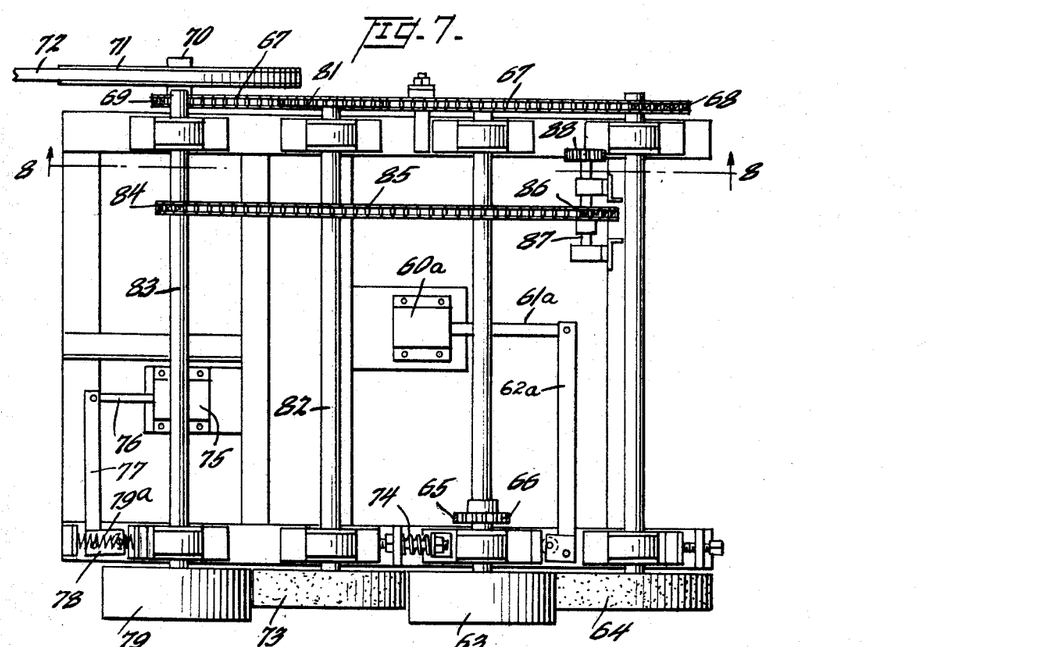
FIG. 7 is an enlarged top plan view showing the control mechanism for the cross-conveyor belts.
Figure 8:
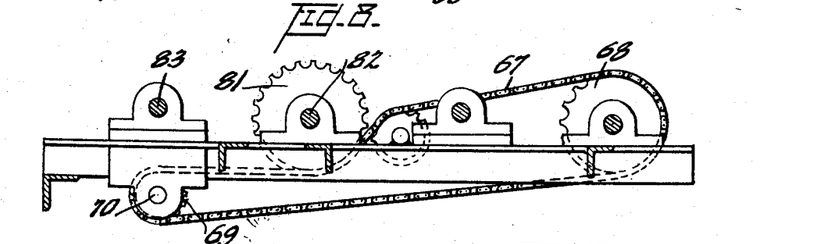
FIG. 8 is a view in vertical cross section taken along the line 8—8 of FIG. 7, and showing in detail certain drive mechanism.
Figure 9:
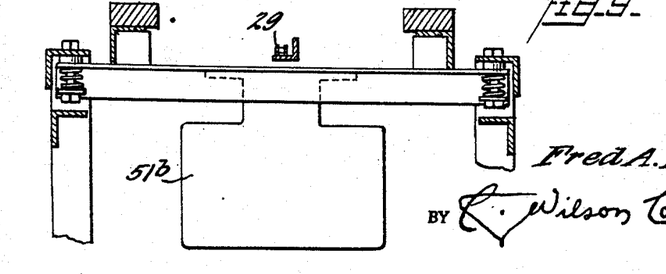
FIG. 9 is a view in vertical cross section taken along the line 9—9 of FIG. 3.

With the raising of the gate at the second weighing position, a solenoid 75 (FIG. 7) through linkage 76, 77, 78 brings wheel 79 into contact with friction wheel 73 which is driven by chain 67 acting on sprocket 81 through shaft 82, which in turn rotates shaft 83 and sprocket gear 84 mounted thereon. A chain 85 in turn revolves gear 86 mounted on stub shaft 87 to rotate another sprocket gear 88, and thereby actuate narrow belt 15 which feeds to the said second station. The belt remains still when the solenoid is not energized. Here as in the case of the first weighing station the gate solenoid and belt solenoid are both connected to the same circuit so that they can operate together. Spring 79a normally holds wheel 79 from wheel 73.

Figure 17:
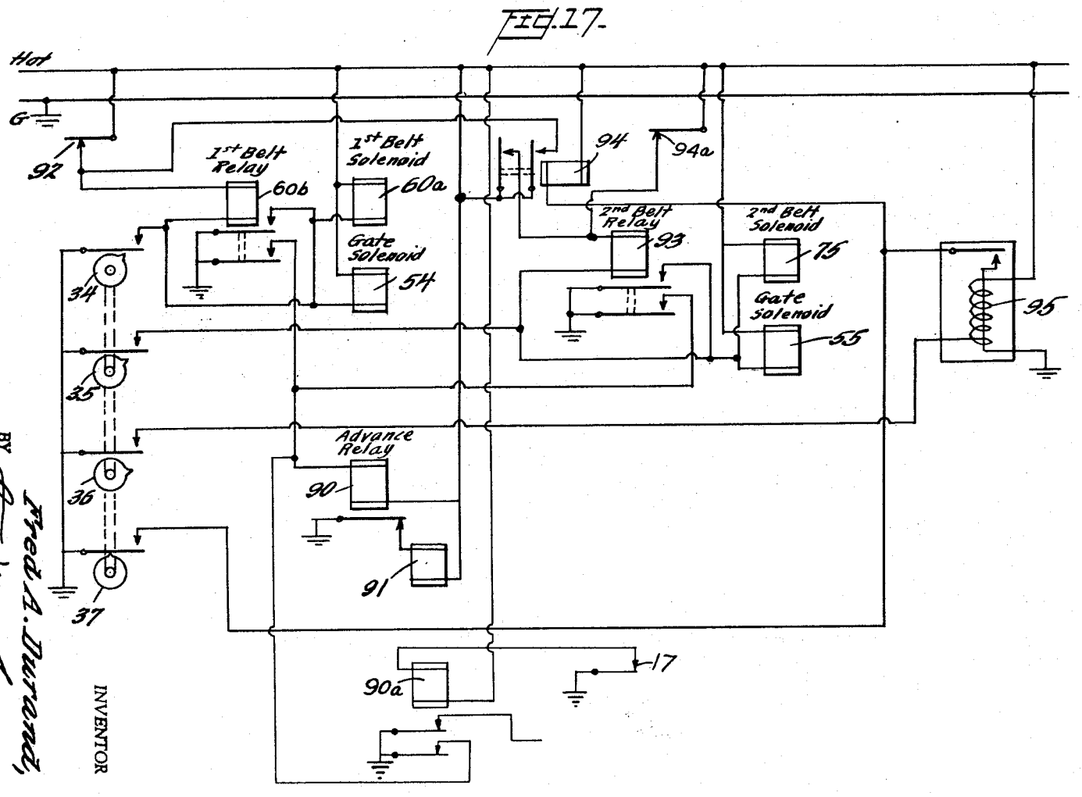
FIG. 17 is a wiring diagram for the entire assembly.

The electrical circuit herein consists of five relays, seven switches and the timer, operation being as follows, as shown by the wiring diagram (FIG. 17):

An entrance relay 90a is energized through the N.C. (normally closed) switch contact of the entrance switch 17 in the up position at which time there is no pan over the switch, and supplies 230 volts to the pan chain motor through one normally open contact, and 230 volts to the motor through the other N.O. (normally open) contact. The other N.C. contact of this entrance relay closes a circuit through the coil of the advance relay 90 with its solenoid 91, which relay supplies 115 volts to a solenoid controlling one revolution clutch 26a. Said relay is energized and the conveyor is stopped if the entrance switch is inoperative or either of the two belt relays is closed. In the absence of any of these conditions, the advance solenoid is energized and the conveyor moves forward.

The coil of the first belt relay 60b is energized by the closing of the N.O. contact of roller switch 34 (FIG. 5), which switch makes only momentary contact, but the relay locks in the closed position by current passing through one of its N.O. contacts, through the coil and through the N.C. contact of the number one scale switch 92. If desired, a signal light controlled by the N.O. contact of this switch may be provided so that the light comes on when the scale moves down. The N.O. contact of this relay which locks the relay in closed position, also supplies current to the belt solenoid and the gate solenoid so that as long as this relay is closed the belt moves peaches to the tub and the gate is raised. The other N.O. contact of this relay closes the circuit through the advance relay coil so that the conveyor cannot advance while this relay remains closed. When the scale moves down, switch 92 opens the relay contacts, the belt 12 reverses so that peaches no longer go to the tub, the gate drops and the advance relay circuit is no longer held closed by this relay.

The second belt relay 93 has its coil energized by the momentary closing of the N.O. contact of the second roller operated control switch 35, the circuit being similar to that of the first belt relay. The relay locks through the N.C. contact of the number two scale switch 94a. When the scale moves down the relay contacts open; when the contacts are closed the second gate is up, peaches move single file into the tub on belt 15, and the advance relay coil is energized, thereby stopping the conveyor.

The timer coil 95 is energized by the momentary closing of the N.O. contact of the timer switch 36, which starts a timing interval and closes the timer switch during this interval. The timer starts just before the conveyor stops and the timer remains closed about one second, which interval can of course be changed as desired.

Special attention is now directed to scale hold relay 94, which is an important part of the instant invention, and the function of which is to close shunts across the N.C. contacts of the two scale switches to make them inoperative during the movement of the conveyor and for a short time after the conveyor stops. During the advance of the conveyor, filled tubs are moved from the scales and other tubs are placed on them with consequent opening and closing of the scale switches, the scales continuing to vibrate for a short time after the conveyor stops. It is highly desirable or even necessary that the apparatus be allowed to stabilize itself between weighing operations, and this is the ultimate purpose and function of the scale hold relay. 95 is a conventional part of the relay.

The coil on the scale hold relay is energized by the N.C. contact on the scale hold switch 37 which is held in open position while the conveyor is immobile. The adjustment of the interval during which the scale switches are inoperative after the conveyor stops is very important. If the interval is too long the tubs may be overfilled before the scale can cut the filling operation, and if the interval is too short, the vibration of the scales resulting from the conveyor movement and other factors, may cut the filling before the desired weight of fruit is placed in the tub, this obviously resulting in underweight.

From the foregoing it is believed that the operation of the instant filling machine will be obvious to those skilled in the art, and that it is accordingly unnecessary to resort to further detailed description thereof.

While one form of subject device has been illustrated rather minutely herein, no limitations are thereby implied, it being apparent that various modifications, reconstructions, changes and re-arrangements may be resorted to without departing from the scope of the appended claims.

I claim:

1. In an automatic filler, a primary conveying system for receiving articles and for passing said articles in a circulatory path, said primary conveying system including a first discharge means and a second discharge means arranged along said path for discharging said articles from said primary conveyor system respectively into first and second zones, a secondary conveying system for moving receptacles along a predetermined path and for successively positioning said receptacles in said zones, and means for weighing said receptacles while on said secondary weighing system.

2. In an automatic filler, a primary conveying system for receiving articles and for passing said articles in a path, said primary conveying system including a first discharge means and a second discharge means arranged along said path for discharging said articles from said primary conveyor system respectively into first and second weighing zones, a secondary conveying system for moving receptacles along a predetermined path and for positioning said receptacles in said weighing zones, a first weighing station in said first weighing zone, a second weighing station in said second weighing zone, and means controlled by said weighing stations for controlling the actuation of said discharge means.

3. In an automatic filler, a primary conveying system for receiving articles and for passing said articles in a circulatory path, said primary conveying system including a first discharge means and a second discharge means arranged along said path for discharging said articles from said primary conveyor system respectively into first and second weighing zones, a secondary conveying system for moving receptacles along a predetermined path and for positioning said receptacles in said weighing zones, first weighing station in said first weighing zone, a second weighing station in said second weighing zone, means controlled by said first weighing station for controlling the actuation of said first discharge means, means controlled by said second weighing station for controlling the actuation of said second discharge means, and means controlled by the presence of a receptacle on the secondary conveyor system for actuating said secondary conveying system.

4. An automatic filler, a primary conveying system for receiving articles and for passing said articles in a circulatory path, said primary conveying system including a first discharge means and a second discharge means arranged along said path for discharging said articles from said primary conveyor system respectively into first and second weighing zones, a secondary conveying system for moving receptacles along a predetermined path and for positioning said receptacles in said weighing zones, a first weighing station in said first weighing zone, a second weighing station in said second weighing zone, means controlled by said first weighing station for controlling the actuation of said first discharge means, means controlled by said second weighing station for controlling the actuation of said second discharge means, and means controlled by the presence of a receptacle on the secondary conveyor system and by said means controlled by said first weighing station and by said means controlled by said second weighing station for actuating said secondary conveying system.

5. In a device of the character described, a primary source of supply of articles to be packed, a belt communicating therewith and moving in one direction, a back belt disposed to the rear of said first belt and moving in the opposite direction thereto, baffle means for continuously directing articles from the back belt to said first-mentioned belt, a first transverse belt disposed transversely of said two belts and passing over the top of the first and under the second, said transverse belt being normally driven so as to carry articles on said front belt to said back belt, a second and smaller transverse belt parallel to said first transverse belt and also passing over the front belt and under the back belt but closer to the source of supply than the first transverse belt, said baffle being located between said source of supply and said second belt, said smaller belt being normally inoperative, discharge gates adjacent the front ends of said transverse belts, a continuous pan-carrying conveyor operatively disposed below said gates, a primary weighing station beneath said conveyor and immediately below the first gate, a second weighing station similarly placed below the second gate, and a synchronized scale and belt switch circuit for filling pans on the conveyor to a predetermined accurate weight.

6. In a device of the character described, a source of fruit supply, a conveyor system for passing said fruit in a circulatory path, said conveyor system including a belt communicating with said source, a second belt disposed to the rear of said first belt and moving in the opposite direction thereto; a transverse cross-belt communicating with said first two belts, and means for reversing the movement of said cross-belt relative to said belts.

7. In a device of the character described, a primary source of supply to articles to be packed, a front belt communicating therewith and moving in one direction, a back belt disposed in the rear of said front belt and moving in a direction opposite to the direction of movement of said front belt, baffle means for continuously directing articles from said back belt to said front belt, a first transverse belt disposed over said front belt and normally driven so as to carry articles on said front belt to said back belt, a second transverse belt disposed over said front belt and closer to said source of supply than said first transverse belt, said baffle being located between said source of supply and said second belt, said second belt being normally inoperative, discharge gates adjacent the front end of said transverse belts, a continuous pan-carrying conveyor operatively disposed below said gates, a primary weighing station beneath said pan-carrying conveyor and immediately below said first gate, a second weighing station beneath said pan-carrying conveyor and immediately below said second gate, and means for synchronizing the operation of the device so that when a first pan enters the zone of the first weighing station said first gate is opened and said first transverse belt is actuated in a direction opposite to the direction in which it is normally driven so as to deliver articles thereon to a pan disposed in said first weighing station until a predetermined weight less than the final desired weight is in said first pan, at which time said first gate is closed and the motion of said first transverse belt is reversed and said first pan is moved by said pan-carrying conveyor to said second weighing station and said first pan is replaced by a second pan at the first weighing station, said means for synchronizing the operation of said device being so constructed and arranged that when said first pan is received at the second weighing station, said second belt is actuated and said second gate is opened to finish filling said first pan as said second pan is partially filled by said first transverse belt and when said first pan is loaded by said second transverse belt and said second pan is loaded by said second transverse belt, said first gate is closed and the motion of said first belt is reversed.

8. The structure defined in claim 7 wherein said means for synchronizing the operation of the device includes an entrance switch actuated by a pan on said pan carrying conveyor for controlling said transverse belts.

9. The structure defined in claim 7 wherein said means for synchronizing the operation of the device includes a scale hold circuit and a timer associated with said scale hold circuit for momentarily interrupting the actuation of said transverse belts.

References Cited in the file of this patent
UNITED STATES PATENTS

| | | |
|---|---|---|
| 899,762 | Richards | Sept. 29, 1908 |
| 954,722 | Doble | Apr. 12, 1910 |
| 1,099,662 | Murphy | June 9, 1914 |
| 1,276,903 | Green | Aug. 27, 1918 |
| 1,479,866 | Moores | Jan. 8, 1934 |
| 1,994,797 | Thomas | Mar. 19, 1935 |
| 2,082,567 | Bleam | June 1, 1937 |
| 2,139,903 | Mason | Dec. 13, 1938 |
| 2,333,790 | Howard | Nov. 9, 1943 |
| 2,581,732 | Thompson | Jan. 8, 1952 |
| 2,833,393 | Kay | May 6, 1958 |